(12) United States Patent
Hinaga

(10) Patent No.: US 10,725,513 B2
(45) Date of Patent: *Jul. 28, 2020

(54) IMAGE FORMING APPARATUS, POWER CONTROL METHOD, AND NON-TRANSITORY RECORDING MEDIUM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Keiichi Hinaga, Susono Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,787

(22) Filed: Jul. 22, 2019

(65) Prior Publication Data

US 2019/0339758 A1 Nov. 7, 2019

Related U.S. Application Data

(63) Continuation of application No. 15/933,464, filed on Mar. 23, 2018, now Pat. No. 10,401,930.

(51) Int. Cl.
*G03G 15/00* (2006.01)
*G06F 1/26* (2006.01)
(Continued)

(52) U.S. Cl.
CPC ............... *G06F 1/26* (2013.01); *B41J 29/38* (2013.01); *G03G 15/5083* (2013.01);
(Continued)

(58) Field of Classification Search
CPC ........ G06F 1/26; G06K 9/00228; B41J 29/38; G03G 21/00; G03G 15/5004; G03G 15/5091; G03G 15/5016; G03G 15/80
See application file for complete search history.

(56) References Cited

U.S. PATENT DOCUMENTS 9,170,539 B2 10/2015 Okuzono
9,459,576 B2 10/2016 Okuzono
2015/0261168 A1* 9/2015 Yokoyama ......... G03G 15/5004
399/81

FOREIGN PATENT DOCUMENTS

JP 4-81774 3/1992
JP 11-348379 12/1999
JP 2006-076109 3/2006

* cited by examiner

*Primary Examiner* — Hoang X Ngo
(74) *Attorney, Agent, or Firm* — Amin, Turocy & Watson, LLP

(57) ABSTRACT

An image forming apparatus in an embodiment is configured to include an image processing device, a storage device, a power supply device, and a control unit. The image processing device forms an image on a sheet. The storage device stores schedule information indicating a schedule of use-time of the image processing device. The power supply device supplies power to the image processing device. The control unit is configured to control the power supply device so as to start supplying the power to the image processing device if the power supply device stops supplying the power to the image processing device at the use-time indicated by the schedule information and when a sensor provided at the installation site of the image forming apparatus determines that a detection result is a predetermined detection result.

18 Claims, 9 Drawing Sheets

(51) Int. Cl.
   *G06K 9/00* (2006.01)
   *G03G 21/00* (2006.01)
   *B41J 29/38* (2006.01)
(52) U.S. Cl.
   CPC ......... *G03G 21/00* (2013.01); *G06K 9/00228* (2013.01); *G03G 15/5004* (2013.01); *G03G 15/5016* (2013.01); *G03G 15/5091* (2013.01)

FIG. 7

MFP USE TIME SETTING

IF YOU WANT TO USE MFP, PLEASE SET MFP TO BE USED AND SCHEDULED USE TIME.

MFP (IP ADDRESS): [F21]

USE START TIME: [F22]    END TIME: [F23]

[B21 APPLY FOR USE]    [B22 CANCELLATION]

FIG. 8

POWER-OFF CHECKING

THE POWER OF THE MFP WILL BE TURNED OFF AT 00:00.
IF YOU WANT TO CONTINUE TO USE, PLEASE REQUEST EXTENSION OF THE USE TIME AS FOLLOWS.

EXTENSION TIME: USE UNTIL [F31]

[B31 EXTENSION REQUEST]    [B32 NO-EXTENSION]

IMAGE FORMING APPARATUS, POWER CONTROL METHOD, AND NON-TRANSITORY RECORDING MEDIUM

CROSS-REFERENCE TO RELATED APPLICATIONS

This application is a Continuation of application Ser. No. 15/933,464 filed on Mar. 23, 2018, the entire contents of which are incorporated herein by reference.

FIELD

Embodiment described herein relates generally to an image forming apparatus, a power control method, and a non-transitory recording medium.

BACKGROUND

In the related art, an image forming apparatus has been performing a power control based on a schedule of use. Setting of this schedule is performed, for example, by the user's personal computer. Alternatively, the image forming apparatus has been performing the power control based on a result of detection by a human sensor or a face authentication function.

It takes time for the image forming apparatus to be in a usable state after the power is turned on. Therefore, the power of the image forming apparatus is turned on according to the user's schedule of use by the above-described power control. In this way, a user's convenience can be ensured.

However, if the power control is performed based on the schedule, the image forming apparatus sometimes determines that a current time is within the use-time despite the fact that a person is not present on the floor. Based on this determination, the image forming apparatus sometimes turns on the power in a situation in which there is actually no scheduled use. On the other hand, if the power control is performed based on the sensor, when the image forming apparatus determines that there is a person on the floor, in some cases, the power is turned on even if it is out of the scheduled use-time. Therefore, in the power control in the related art, there is a possibility that the time period may increase, during which the power of the image forming apparatus is turned on without the scheduled use.

An object of the present exemplary embodiments is to provide an image forming apparatus, a power control method, and a non-transitory recording medium capable of saving the energy while ensuring the convenience for the user.

DESCRIPTION OF THE DRAWINGS

FIG. 7 is a display example of a use-time setting screen.

FIG. 8 is a display example of a power-off checking screen.

DETAILED DESCRIPTION

An image forming apparatus in the embodiment has an image processing device, a storage device, a power supply device, and a control unit. The image processing device forms an image on a sheet. The storage device stores schedule information indicating a schedule of use-time of the image processing device. The power supply device supplies power to the image processing device. The control unit controls the power supply device so as to supply the power to the image processing device if the power supply device stops supplying power to the image processing device at the use-time indicated by the schedule information and when a sensor for detecting a presence of a person detects that a person is present.

Hereinafter, the image forming apparatus, a power control method, and a non-transitory recording medium in the embodiment will be described with reference to the drawings.

Figure 1:
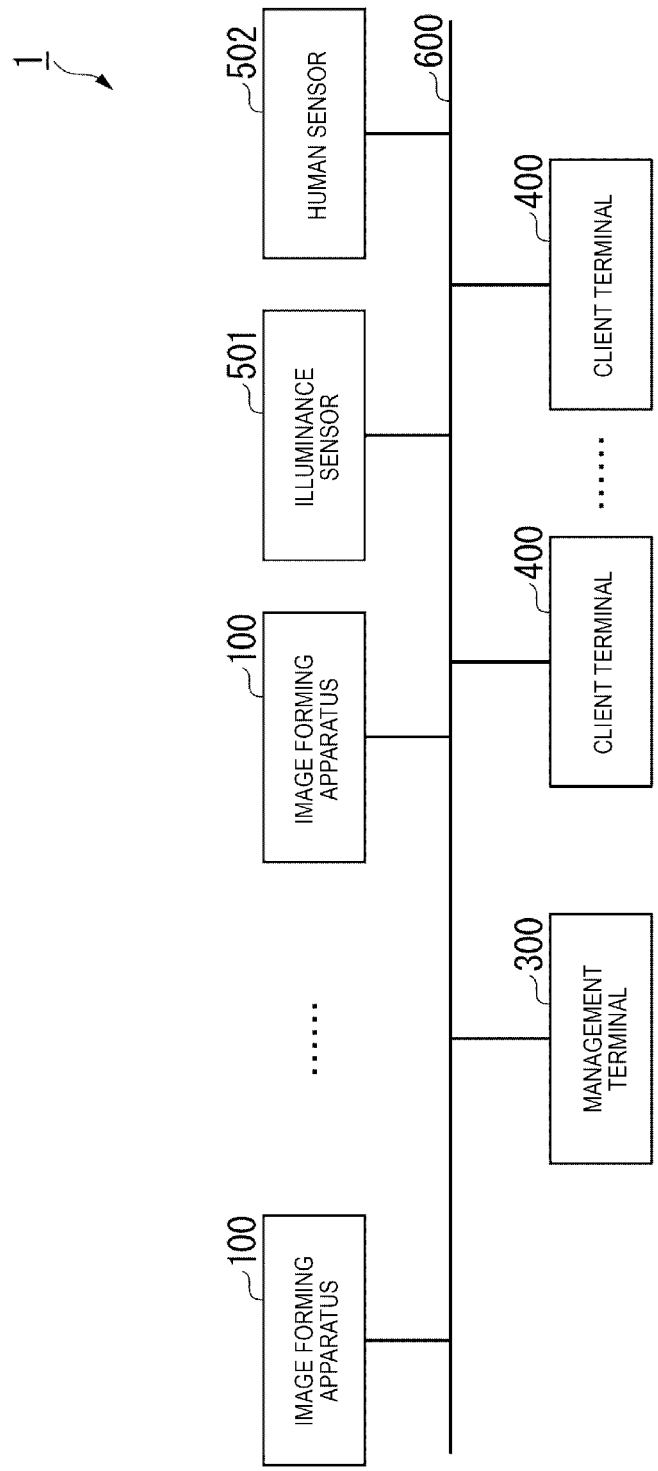
FIG. 1 is a configuration diagram of an image forming system.

FIG. 1 is a configuration diagram of an image forming system 1 in the embodiment. The image forming system 1 includes an image forming apparatus 100, a management terminal 300, a client terminal 400, an illuminance sensor 501, and a human sensor 502. The image forming apparatus 100, the management terminal 300, the client terminal 400, the illuminance sensor 501, and the human sensor 502 are connected to a network 600. The network 600 is, for example, a local area network (LAN) line. The number of image forming apparatuses 100, the client terminals 400, the illuminance sensors 501 and the human sensor 502 may be any number. In description of the present embodiment, as an example, the number of the image forming apparatuses 100 and the client terminals 400 are plural. All of the plurality of image forming apparatuses 100 may be installed on a same floor, or all or some of the image forming apparatuses 100 may be installed on different floors.

In the present embodiment, the management terminal 300 executes a function of managing the supply of power to the image forming apparatus 100. The client terminal 400 sets the use-time information on the image forming apparatus 100. The management terminal 300 collectively manages those pieces of use-time information. When it is determined that a condition is satisfied based on the managed use-time information, the management terminal 300 sends an instruction to the image forming apparatus 100 to perform the power control. The image forming apparatus 100 performs the power control processing according to the received instruction.

The illuminance sensor 501 and the human sensor 502 are examples of sensors for detecting a presence of a person. The illuminance sensor 501 and the human sensor 502 are provided at the installation site of the image forming apparatus 100. For example, the illuminance sensor 501 is installed on a place where it is possible to effectively detect whether or not the illumination on the floor is turned on. In addition, the human sensor 502 is installed on a place where it is possible to effectively detect that a person is present on the floor where the image forming apparatus 100 is installed. The image forming apparatus 100 may include one or both of the illuminance sensor 501 and the human sensor 502.

Figure 2:
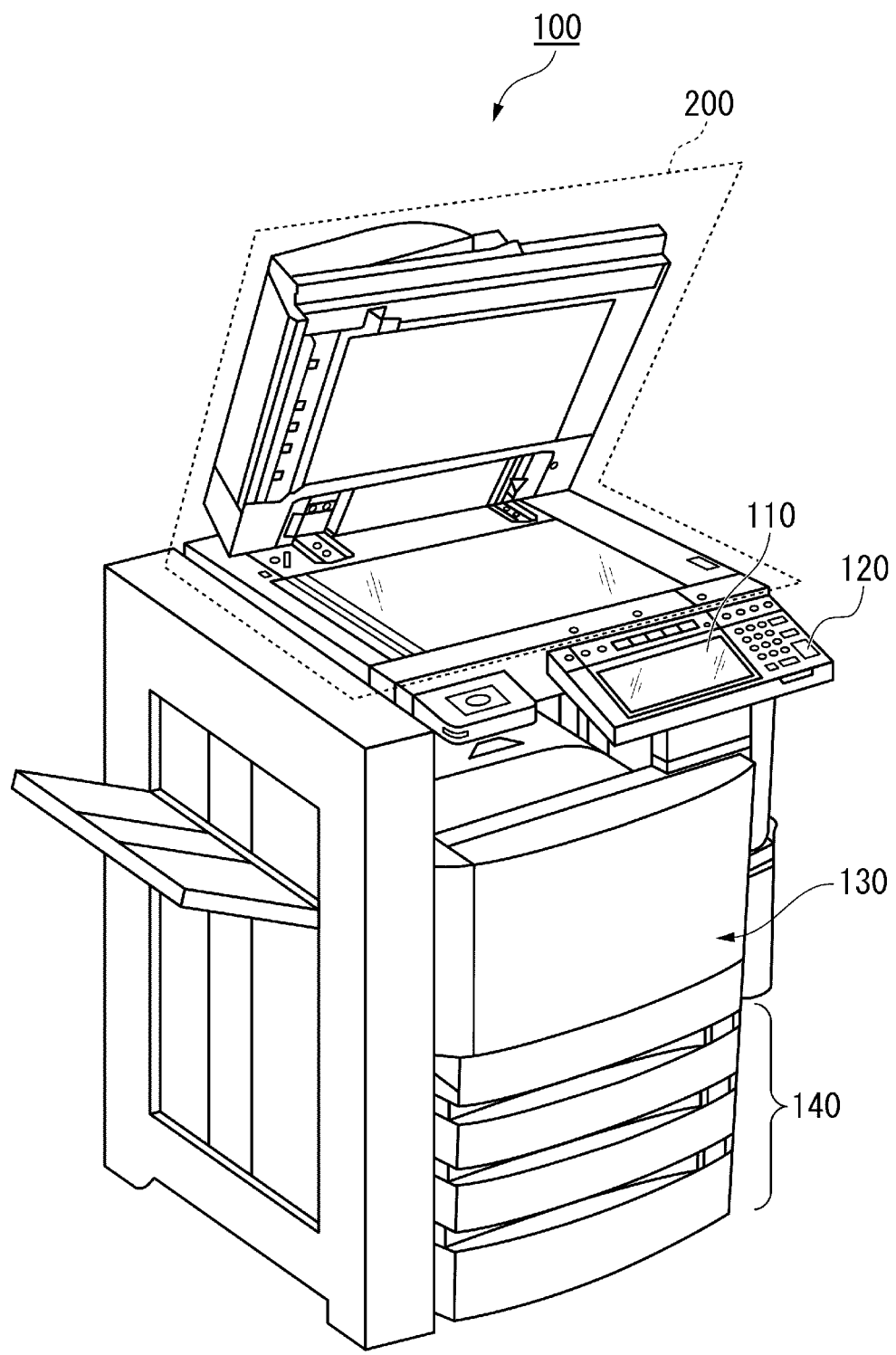
FIG. 2 is an external diagram illustrating an overall configuration example of an image forming apparatus.

FIG. 2 is an external view illustrating an overall configuration example of the image forming apparatus 100 in the embodiment. For example, the image forming apparatus 100 is a multifunction peripheral (MFP). The image forming apparatus 100 includes a display 110, a control panel 120, a printer 130, a sheet accommodation unit 140, and an image reading unit 200. The printer 130 of the image forming apparatus 100 may be a device for fixing a toner image or an inkjet type device.

The image forming apparatus 100 reads an image appearing on the sheet, generates digital data, and generates an image file. The sheet is, for example, a document or a piece of paper on which characters, images, or the like is described. The sheet may be anything that can be read by the image forming apparatus 100. In addition, the image forming apparatus 100 forms an image on a sheet using a developer such as a toner. The sheet in this case is, for example, a piece of paper or label paper. The sheet may be anything as long as the image forming apparatus 100 can form an image on the surface thereof.

The display 110 is an image display device such as a liquid crystal display or an organic electro luminescence (EL) display. The display 110 displays various information items on the image forming apparatus 100.

The control panel 120 includes a plurality of buttons. The control panel 120 receives a user's operation. The control panel 120 outputs a signal corresponding to the operation performed by the user to the control unit of the image forming apparatus 100. The display 110 and the control panel 120 may be configured as an integrated touch panel.

The printer 130 forms an image on the sheet based on the image information generated by the image reading unit 200 or the image information received via the communication path. The printer 130 forms an image through following processing, for example. The image forming unit of the printer 130 forms an electrostatic latent image on a photoconductive drum based on the image information. The image forming unit of the printer 130 forms a visible image by attaching a developer to the electrostatic latent image. A specific example of the developer includes a toner. A transfer unit of the printer 130 transfers the visible image onto the sheet. A fixing unit of the printer 130 fixes the visible image on the sheet by heating and pressurizing the sheet. The sheet on which the image is formed may be a sheet stored in the sheet accommodation unit 140 or may be a sheet fed by a hand. The sheet accommodation unit 140 accommodates the sheets to be used for forming the image in the printer 130.

The image reading unit 200 reads the image information to be read as light and darkness of light. The image reading unit 200 records the read image information. The recorded image information may be transmitted to another information processing apparatus via the network. The recorded image information may be imaged on the sheet by the printer 130.

Figure 3:
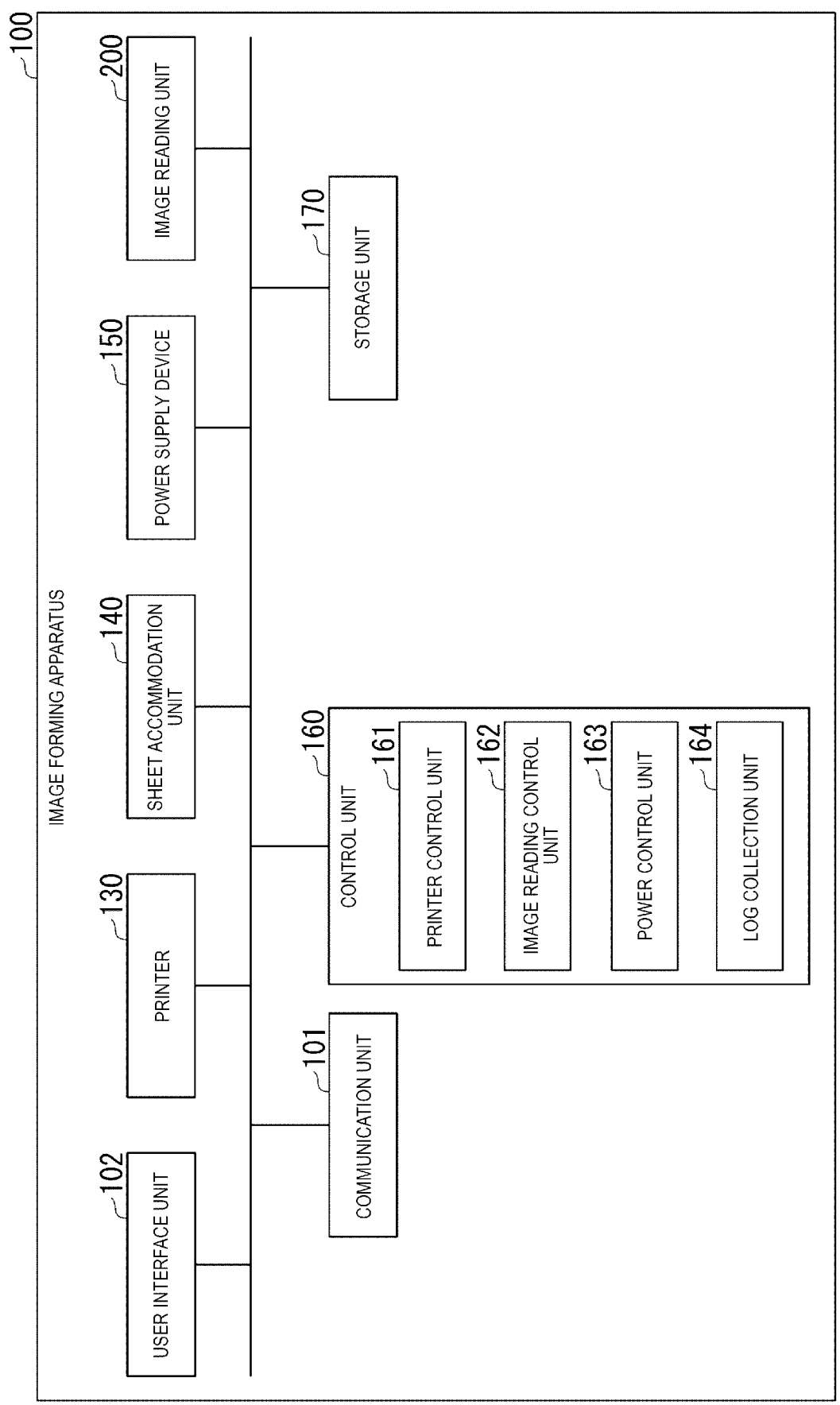
FIG. 3 is a functional block diagram of the image forming apparatus.

FIG. 3 is a functional block diagram of the image forming apparatus 100 in the embodiment. The image forming apparatus 100 includes a communication unit 101, a user interface unit 102, the printer 130, the sheet accommodation unit 140, the power supply device 150, the control unit 160, a storage unit 170, and the image reading unit 200. Since the configurations of the printer 130, the sheet accommodation unit 140 and the image reading unit 200 are as described above, the description thereof will be omitted.

The communication unit 101 is a network interface. The communication unit 101 communicates with the management terminal 300 and the client terminal 400 via the network 600.

The user interface unit 102 corresponds to the display 110 and the control panel 120 in FIG. 2. The user interface unit 102 performs inputting the user's operation and presenting the information to the user. Hereinafter, a case where the user interface unit 102 has a touch panel will be described as an example.

The power supply device 150 supplies power received from the power supply to each unit.

The control unit 160 controls each unit. The control unit 160 is realized by a processor, a memory, and a hard disk drive (HDD). The processor is, for example, a central processing unit (CPU). The memory stores data to be directly referred to when the processor executes processing. The memory is, for example, a random access memory (RAM). The HDD is a non-transitory recording medium. The processor operates as a control unit 160 by reading a computer program for causing a computer to execute the processing from the HDD, and executing the program. The control unit 160 includes a printer control unit 161, an image reading control unit 162, a power control unit 163, and a log collection unit 164.

The printer control unit 161 controls the printer 130. The image reading control unit 162 controls the image reading unit 200. The power control unit 163 controls the supply of power to each unit from the power supply device 150. The power control unit 163 turns on and off the power by a software control according to the instruction of the power control from the management terminal 300. When the power is turned on by the software control, the power control unit 163 shifts a mode from a sleep mode in which the power consumption is lower than a normal mode to the normal mode. In addition, when the power is turned off by the software control, the power control unit 163 shifts the mode from the normal mode to the sleep mode. In the sleep mode, the power control unit 163 controls the power supply device 150 so as to stop supplying the power to some functional units including the image processing device. The image processing device corresponds to the printer 130 and the image reading unit 200. When the mode is shifted to the normal mode, the power control unit 163 restarts to supply the power to the functional unit to which the supply of power has been stopped in the sleep mode.

The log collection unit 164 generates log data of the image forming apparatus 100. Examples of the log data include, for example, information on a job received by the image forming apparatus 100, information on a user's operation performed on the image forming apparatus 100, information on processing performed by the image forming apparatus 100, and information on a shift to a normal mode or a sleep mode. The information on the job received by the image forming apparatus 100 includes identification information on a reception destination of the print job and a transmission source of the print job. The identification information on the transmission source may be the identification information on the client terminal 400 or the identification information on the user. An example of the identification information on the client terminal 400 is an IP address. When the identification information on the client terminal 400 and the identification information on the user are set in the print job, the log collection unit 164 may generate user information in which a linkage of these identification information items is set, and may write the user information into the storage unit 170. In addition, the information on the user's operation includes the types of the user's operation and the identification information on the user who performed the user operation. By referring to the user information, the identification information on the user and the identification information on the client terminal 400 can be mutually converted. The log collection unit 164 adds time information representing a time at which the log data was obtained, to the generated log data, and writes the result into the storage unit 170.

The storage unit 170 is an auxiliary storage device. The storage unit 170 is, for example, an HDD. The storage unit 170 stores computer programs and various data. The data stored in the storage unit 170 includes the log data.

Figure 4:
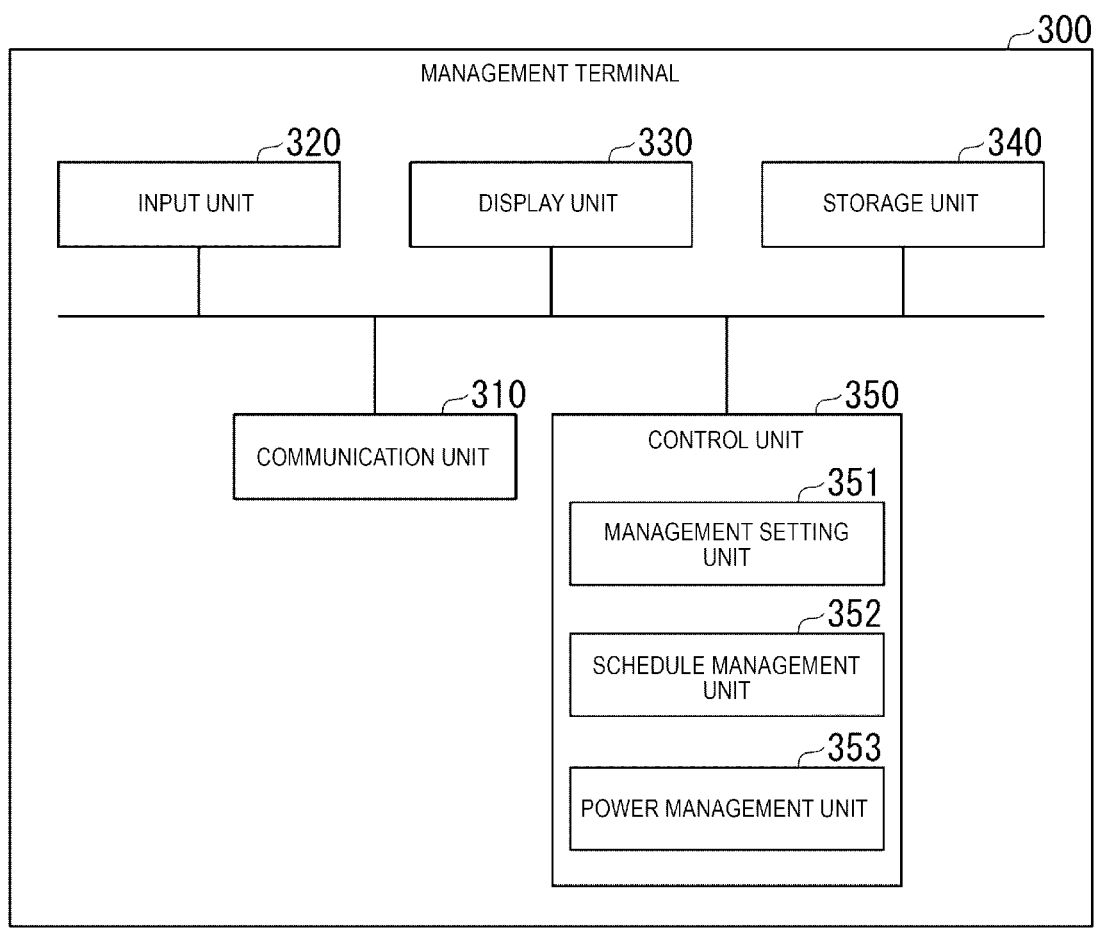
FIG. 4 is a functional block diagram of a management terminal.

FIG. 4 is a functional block diagram of the management terminal 300. The management terminal 300 is, for example, a personal computer. The management terminal 300 includes a communication unit 310, an input unit 320, a display unit 330, a storage unit 340, and a control unit 350.

The communication unit 310 is a network interface. The communication unit 310 communicates with the image forming apparatus 100, the client terminal 400, the illuminance sensor 501, and the human sensor 502 via the network 600.

The input unit 320 is configured using existing input devices such as a keyboard, a pointing device (a mouse, a tablet or the like), a button, a touch panel, and the like. The input unit 320 is operated by the user when inputting a user's instruction into the management terminal 300. The input unit 320 may be an interface for connecting the input devices to the management terminal 300. In this case, the input unit 320 inputs an input signal generated according to the user's input to the input devices to the management terminal 300.

The display unit 330 is an image display device such as a cathode ray tube (CRT) display, a liquid crystal display, an organic electro luminescence (EL) display, or the like.

The storage unit 340 is a main storage device. The main storage device is, for example, an HDD. The storage unit 340 stores computer programs and various data. The data stored in the storage unit 340 includes manager setting data, use-time setting data, and the schedule information. The manager setting data indicates a message sending time before the power is turned off for each image forming apparatus 100, whether or not the illuminance sensor 501 is used, whether or not the human sensor 502 is used, and a checking interval of the sensor. The use-time setting data includes the identification information on the user, the identification information on the client terminal 400 used by the user, the identification information on the image forming apparatus 100 used by the user, and the scheduled use-time period of the image forming apparatus 100. The use-time period is indicated by a use start time and a use end time. The schedule information indicates a scheduled use-time period for the entire user of each image forming apparatus 100. In addition, the storage unit 340 may further store sensor information. The sensor information is information in which the identification information on the image forming apparatus 100 is associated with the identification information on the illuminance sensor 501 used for the power management of the image forming apparatus 100 and the identification information on the human sensor 502.

The control unit 350 controls each unit. The control unit 350 is realized by a processor, a memory, and an HDD. The processor operates as a control unit 350 by reading a computer program for causing a computer to execute the processing from the HDD, and executing the program. The control unit 350 includes a management setting unit 351, a schedule management unit 352, and a power management unit 353.

The management setting unit 351 manages the manager setting data based on the information input by the manager through the input unit 320. The schedule management unit 352 manages the use-time setting data received from the client terminal 400. Furthermore, the schedule management unit 352 generates schedule information based on the use-time setting data received from each client terminal 400 and writes the schedule information into the storage unit 340.

The power management unit 353 performs the power management of the image forming apparatus 100 based on the use-time indicated by the schedule information and the results of detection by the illuminance sensor 501 and the human sensor 502. If the power of the image forming apparatus 100 is turned off within the use-time indicated by the schedule information, the power management unit 353 determines whether or not a presence of a person is detected using the result of detection by the illuminance sensor 501 or the human sensor 502. When the power is turned off, the power supply device 150 of the image forming apparatus 100 stops supplying the power to the image processing device. When it is determined that a presence of a person is detected, the power management unit 353 controls the power supply device 150 to start supplying the power to the image processing device.

In addition, if the power of the image forming apparatus 100 is turned on within the use-time indicated by the schedule information, the power management unit 353 transmits a power-off notification to the client terminal 400 before the use end time. If the request for the extension of the use-time is not received from the client terminal 400 after the power-off notification, the power management unit 353 controls the power supply device 150 of the image forming apparatus 100 such that the supply of the power to the image processing device 100 is stopped at the use end time. On the other hand, if the request for the extension of the use-time corresponding to the power-off notification is received, the power management unit 353 updates the use end time set in the schedule information to a use end time after the extension set in the extension request.

Figure 5:
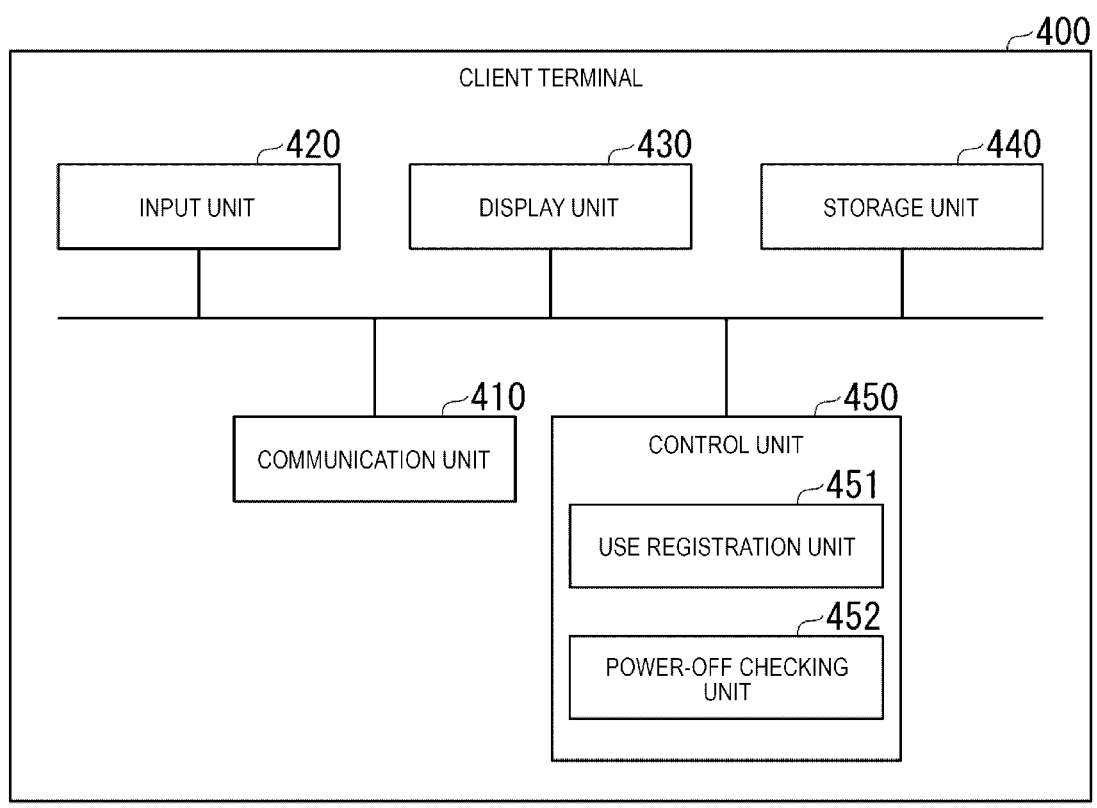
FIG. 5 is a functional block diagram of a client terminal.

FIG. 5 is a functional block diagram of the client terminal 400. The client terminal 400 is, for example, a personal computer. The client terminal 400 includes a communication unit 410, an input unit 420, a display unit 430, a storage unit 440, and a control unit 450.

The communication unit 410 is a network interface. The communication unit 410 communicates with the image forming apparatus 100 and the management terminal 300 via the network 600. The input unit 420 is similar to the input unit 320 of the management terminal 300. The input unit 420 is operated by the user when inputting the user's instruction to the client terminal 400. The display unit 430 is similar to the display unit 330 of the management terminal 300. The storage unit 440 is a main storage device. The storage unit 440 stores computer programs and various data.

The control unit 450 controls each unit. The control unit 450 is realized by a processor, a memory, and an HDD. The processor operates as a control unit 450 by reading a computer program for causing a computer to execute the processing from the HDD, and executing the program. The control unit 450 includes a use registration unit 451 and a power-off checking unit 452. The use registration unit 451 generates schedule information based on the information input by the user through the input unit 420. The use registration unit 451 transmits the generated schedule information to the management terminal 300. When the power-off notification is received from the management terminal 300, the power-off checking unit 452 displays a message inquiring whether or not to extend the use end time of the image forming apparatus 100 on the display unit 430. The power-off checking unit 452 transmits an extension request to the management terminal 300 according to the user's input. The use end time after the extension is set in the extension request.

Figure 6:
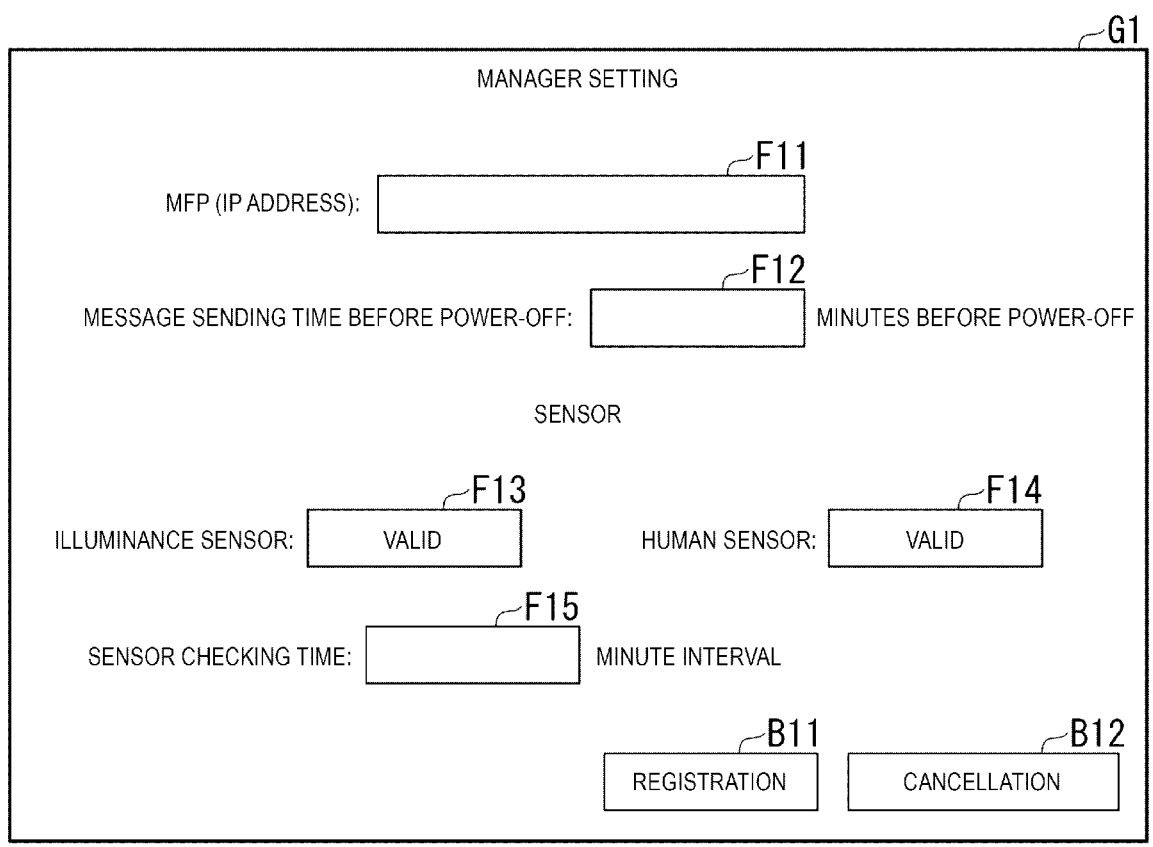
FIG. 6 is a display example of a manager setting screen.

FIG. 6 is a display example of a manager setting screen G1. The management setting unit 351 of the management terminal 300 displays the manager setting screen G1 on the display unit 330. The manager setting screen G1 includes setting fields F11 to F15, a registration button B11, and a cancellation button B12.

In the setting field F11, identification information for specifying the image forming apparatus 100 is set. In the present embodiment, an IP address of the image forming apparatus 100 is used as the identification information. In the setting field F12, how many minutes before the use end time of the image forming apparatus 100 a message of power-off notification is sent to the client terminal 400, is set. In the setting field F13, it is possible to select whether to make the illuminance sensor 501 valid or invalid from the pull-down menu. In the setting field F14, it is possible to select whether to make the human sensor 502 valid or invalid from the pull-down menu. As described above, if there are multiple types of sensors, it is possible to set the type of sensor of which the result of detection is used. The checking interval of the sensor is set in the setting field F15. The manager inputs the setting content to the setting fields F11 to F15 using the input unit 320 and presses the registration button B11. The management setting unit 351 generates manager setting data indicating the setting content of the setting fields F11 to F15 and writes the result into the storage unit 340. If the cancellation button B12 is pressed, the management setting unit 351 does not generate the manager setting data.

FIG. 7 is a display example of a use-time setting screen G2. The use registration unit 451 of the client terminal 400 displays the use-time setting screen G2 on the display unit 430. The use-time setting screen G2 includes setting fields F21 to F23, a registration button B21, and a cancellation button B22. In the setting field F21, an IP address is set as identification information for identifying the image forming apparatus 100. In the setting field F22, the use start time of the image forming apparatus 100 is set. In the setting field F23, the use end time of the image forming apparatus 100 is set. The user inputs the setting content to the setting fields F21 to F23 using the input unit 420 and presses the registration button B21. The use registration unit 451 generates use-time setting data indicating the setting content of the setting fields F21 to F23 and identification information on the client terminal 400, and transmits the result to the management terminal 300. If cancellation button B22 is pressed, the use registration unit 451 does not generate the use-time setting data.

The schedule management unit 352 of the management terminal 300 writes the use-time setting data received from the client terminal 400 into the storage unit 340. Every time the use-time setting data is received from the client terminal 400, the schedule management unit 352 reads the use-time setting data in which the identification information on the image forming apparatus 100 is set, which is the same as the received use-time setting data, from the storage unit 340. The schedule management unit 352 calculates a logical sum of the use-time set in the received use-time setting data and the use-time set in each of the read use-time setting data. The result of calculation represents the use-time of the image forming apparatus 100 for the entire user. The schedule management unit 352 writes schedule information associating the identification information on the image forming apparatus 100 with the use-time of the image forming apparatus 100 for the entire users into the storage unit 340.

FIG. 8 is a display example of a power-off checking screen G3. When the power-off notification transmitted from the power management unit 353 of the management terminal 300 is received, the power-off checking unit 452 of the client terminal 400 displays the power-off checking screen G3. The power-off notification is used as an inquiry for the extension of the use-time of the image forming apparatus 100. The power-off notification includes the identification information on the image forming apparatus 100 and information on the use end time of the image forming apparatus 100. On the power-off checking screen G3, a message indicating that the power of the image forming apparatus 100 will be turned off at the use end time set in the power-off notification is displayed. In addition, the power-off checking screen G3 includes a setting field F31, an extension request button B31, and a no-extension button B32. In the setting field F31, the scheduled use end time after the scheduled use-time extension is set. In a case of extending the scheduled use-time, the user inputs the setting content to the setting field F31 using the input unit 420, and presses the extension request button B31. The power-off checking unit 452 transmits the extension request in which the use end time set in the setting field F31 and the identification information on the image forming apparatus 100 are set, to the management terminal 300.

The schedule management unit 352 of the management terminal 300 receives the extension request from the client terminal 400. The schedule management unit 352 identifies the schedule information based on the identification information on the image forming apparatus 100 set in the extension request. The schedule management unit 352 rewrites the use end time set in the specified schedule information into the use end time set in the extension request.

In a case of not extending the scheduled use-time, the user presses no-extension button B32 using the input unit 420. The power-off checking unit 452 may notify the management terminal 300 of the no-extension or may not send the notification to the management terminal 300.

Figure 9:
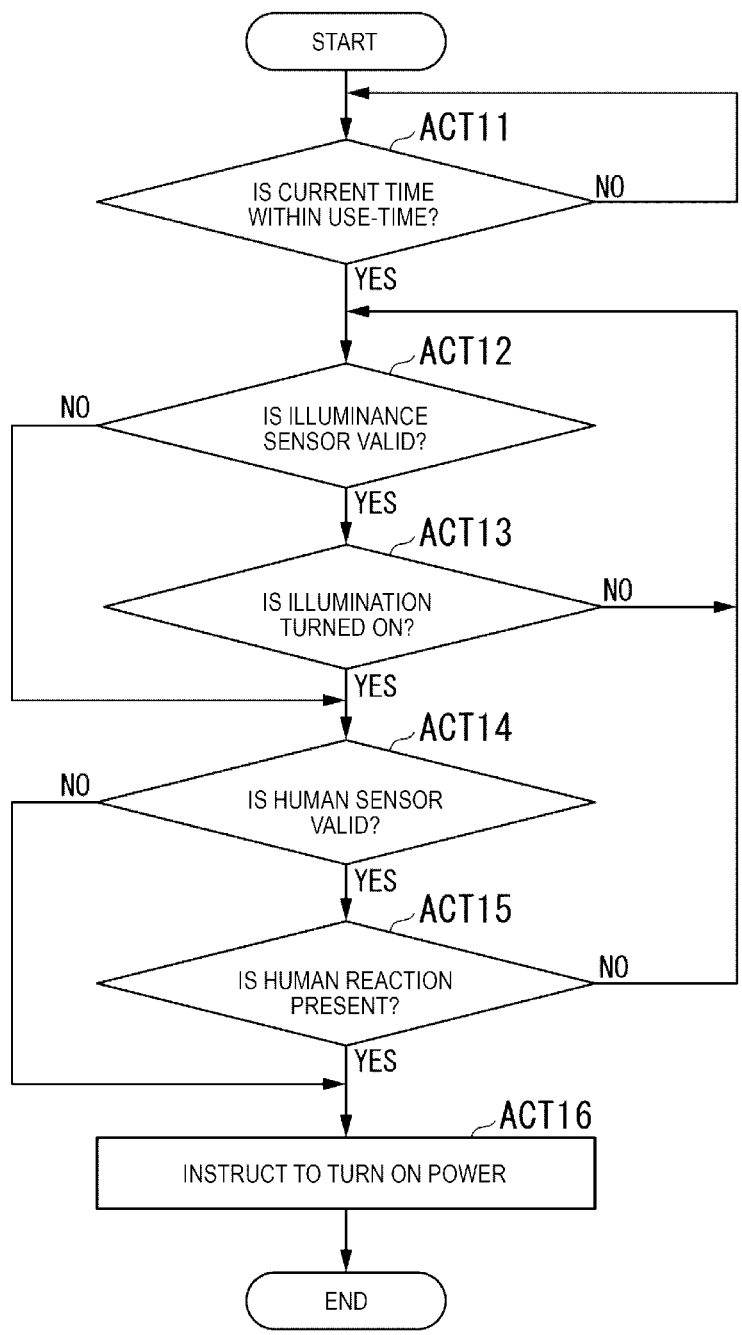
FIG. 9 is a flowchart illustrating power-on control processing by the management terminal.

FIG. 9 is a flowchart illustrating the power-on control processing by the management terminal 300. The management terminal 300 performs power-on control processing in FIG. 9 on each image forming apparatus 100 in the power-off state (sleep mode).

The power management unit 353 of the management terminal 300 reads the use-time of the image forming apparatus 100 subject to the power management from the schedule information stored in the storage unit 340. The power management unit 353 determines whether or not the current time is within the use-time (ACT11). If it is determined that the current time is not within the use-time (NO in ACT11), the power management unit 353 returns the process to ACT 11.

If it is determined that the current time is within the use-time (YES in ACT11), the power management unit 353 reads the manager setting information from the storage unit 340, in which the identification information on the image forming apparatus 100 subject to the power management is set. The power management unit 353 determines whether or not the illuminance sensor is valid referring to the read manager setting information (ACT 12). If it is determined that the illuminance sensor is invalid (NO in ACT 12), the power management unit 353 performs ACT 14 described later. If it is determined that the illuminance sensor is valid (YES in ACT 12), the power management unit 353 specifies an illuminance sensor 501 to be used for the power management of the image forming apparatus 100 subject to the power management referring to the sensor information. The power management unit 353 acquires the result of detection by the specified illuminance sensor 501. The power management unit 353 may read the result of detection finally received from the illuminance sensor 501 from the storage unit 340 or may receive the result of detection from the illuminance sensor 501 at the next checking interval of the sensor. The power management unit 353 determines whether or not the illumination is turned on based on the result of detection received from the illuminance sensor 501 (ACT 13). For example, the power management unit 353 determines whether or not the illumination is turned on by comparing the result of detection by the illuminance sensor 501 with a threshold value. If it is determined that the illumination is not turned on (NO in ACT 13), the power management unit 353 returns the process to ACT 12.

If it is determined that the illumination is turned on (YES in ACT 13), the power management unit 353 determines whether or not the human sensor is valid referring to the manager setting information (ACT14). If it is determined that the human sensor is invalid (NO in ACT14), the power management unit 353 performs ACT 16 described later.

If it is determined that the human sensor is valid (YES in ACT14), the power management unit 353 specifies a human sensor 502 to be used for the power management of the image forming apparatus 100 subject to the power management referring to the sensor information. The power management unit 353 acquires the result of detection by the identified human sensor 502. The power management unit 353 may read the result of detection finally received from the human sensor 502 from the storage unit 340 or may receive the result of detection from the human sensor 502 at the next checking interval of the sensor. The power management unit 353 determines whether or not a human reaction is present based on the result of detection received from the human sensor 502 (ACT 15). If the power management unit 353 determines that the human reaction is not present (NO in ACT 15), the power management unit 353 returns the process to ACT 12.

If it is determined that the human sensor is invalid (NO in ACT14), or if it is determined that the human reaction is present (YES in ACT15), the power management unit 353 instructs the image forming apparatus 100 subject to the power management to turn on the power (ACT 16). The power control unit 163 of the image forming apparatus 100 receives the power-on instruction and switches the mode from the sleep mode to the normal mode. The power control unit 163 controls the power supply device 150 to start supplying the power to the image processing device.

Figure 10:
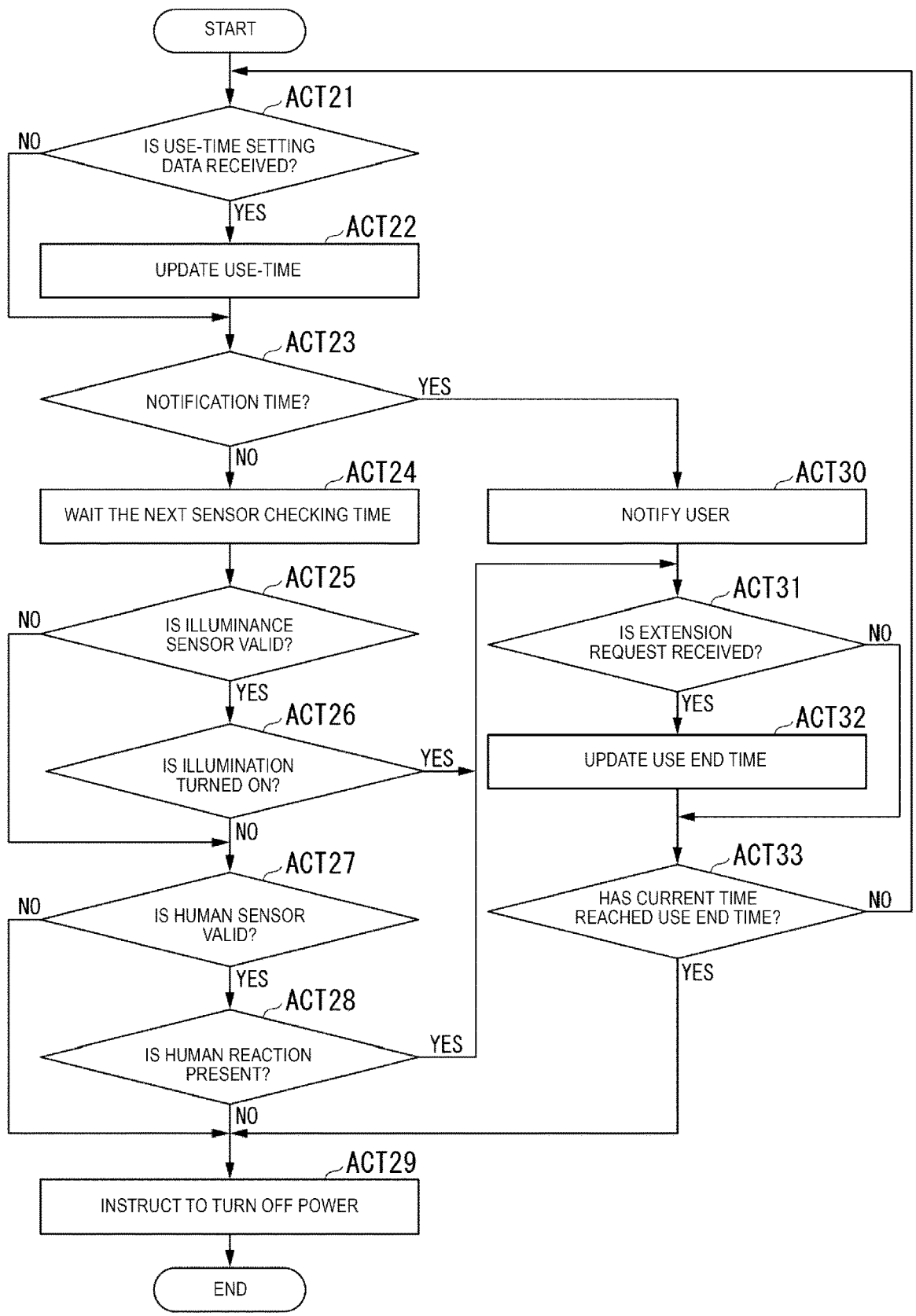
FIG. 10 is a flowchart illustrating power-off control processing by the management terminal.

FIG. 10 is a flowchart illustrating the power-off control processing by the management terminal 300. The management terminal 300 performs the power-off control processing in FIG. 10 on each image forming apparatus 100 in the power-on state (normal mode).

If the use-time setting data is received from the client terminal 400 (YES in ACT 21), the schedule management unit 352 of the management terminal 300 updates the use-time set in the schedule information (ACT 22). If the schedule management unit 352 does not receive the use-time setting data (NO in ACT 21), or after ACT 22 has been processed, the power management unit 353 performs the processing in ACT 23. The power management unit 353 reads the information on the use end time of the image forming apparatus 100 subject to the power management from the schedule information stored in the storage unit 340. In addition, the power management unit 353 reads a message sending time of the image forming apparatus 100 subject to the power management from the manager setting data stored in the storage unit 340. The power management unit 353 calculates a notification time which is retreated back from the use end time as much as the message sending time. If it is determined that the current time has not reached the notification time (NO in ACT 23), the power management unit 353 performs the processing in ACT 24.

The power management unit 353 waits until the next sensor checking time (ACT 24). The power management unit 353 determines whether or not the illuminance sensor is valid referring to the manager setting information on the image forming apparatus 100 subject to the power management (ACT 25). If it is determined that the illuminance sensor is invalid (NO in ACT25), the power management unit 353 performs ACT 27 described later.

If it is determined that the illuminance sensor is valid (YES in ACT25), the power management unit 353 determines whether the illumination is turned on or not based on the result of detection received from the illuminance sensor 501 by the processing similar to that in ACT 13 in FIG. 9 (ACT 26). If it is determined that the illumination is turned on (YES in ACT 26), the power management unit 353 performs ACT 31 described later.

If it is determined that the illumination is not turned on (NO in ACT 26), the power management unit 353 determines whether or not the human sensor is valid referring to the manager setting information on the image forming apparatus 100 subject to the power management (ACT 27). If it is determined that the human sensor is invalid (NO in ACT 27), the power management unit 353 performs ACT 29 described later.

If it is determined that the human sensor is valid (YES in ACT 27), the power management unit 353 determines whether or not the human reaction is present based on the result of detection received from the human sensor 502 by the processing similar to that in ACT 15 in FIG. 9 (ACT 28). If it is determined that the human reaction is present (YES in ACT 28), the power management unit 353 performs ACT 31 described later.

If it is determined that the human sensor is invalid (NO in ACT 27), or if it is determined that the human reaction is not present (NO in ACT 28), the power management unit 353 instructs the image forming apparatus 100 subject to the power management to turn off the power (ACT 29).

On the other hand, if it is determined that the current time has reached the notification time (YES in ACT 23), the power management unit 353 performs the processing in ACT 30. The power management unit 353 reads the use-time setting data from the storage unit 340, in which the IP address of the image forming apparatus 100 subject to the power management is set. The power management unit 353 reads the IP address of the client terminal 400 from each of the read use-time setting data. The power management unit 353 transmits the power-off notification to the client terminal 400 with the read IP address as the transmission destination (ACT 30). In the power-off notification, the use end time and the identification information on the image formation apparatus 100 subject to the power management are set.

The power-off checking unit 452 of the client terminal 400 receives the power-off notification, and displays the power-off checking screen G3 illustrated in FIG. 8. If the extension request is received from the client terminal 400 to which the power management unit 353 transmits the power-off notification (YES in ACT 31), the schedule management unit 352 performs the processing in ACT 32. The schedule management unit 352 selects the latest use end time from the use end times set in the received extension request. The schedule management unit 352 updates the use end time set in the schedule information on the image forming apparatus 100 subject to the power management with the selected use end time (ACT 32).

If the extension request is not received (NO in ACT 31) or after updating the use end time (ACT 32), the power management unit 353 determines whether or not the current time has reached the use end time (ACT 33). If it is determined that the current time has not reached the use end time (NO in ACT 33), the power management unit 353 performs the processing in ACT 21.

On the other hand, if it is determined that the current time has reached the use end time (YES in ACT 33), the power management unit 353 instructs the image forming apparatus 100 subject to the power management to turn off the power (ACT 29). The power control unit 163 of the image forming apparatus 100 receives the instruction to turn off the power supply and shifts the mode to the sleep mode from the normal mode. The power control unit 163 controls the power supply device 150 to stop supplying the power to the image processing device.

Instead of the control unit 350 of the management terminal 300, the control unit 160 of the image forming apparatus 100 may include a management setting unit 351, a schedule management unit 352 and a power management unit 353. In addition, a part or all of the functions of the management setting unit 351, the schedule management unit 352 and the power management unit 353 may be realized by both the control unit 350 of the management terminal 300 and the control unit 160 of the image forming apparatus 100.

In addition, the schedule management unit 352 may generate use-time setting data of each user based on log data stored in the storage unit 170 of the image forming apparatus 100. The schedule management unit 352 calculates the statistics of the time period from the log data, during which each user uses each image forming apparatus 100 in a predetermined period in the past. In the calculation of the statistics, the schedule management unit 352 uses the log data indicating job information received by the image forming apparatus 100 from the client terminal 400 of the user. The schedule management unit 352 may further use the log data indicating the information on a user's operation. The identification information on the client terminal 400 set in the log data is converted into the identification information on the user based on the user information. The schedule management unit 352 sets the use-time period to be the use-time setting data based on the calculated statistics.

For example, the schedule management unit 352 acquires the use start time and the use end time for every day from the log data in a predetermined period in the past for each combination of the user and the image forming apparatus 100. The schedule management unit 352 sets the average of the acquired use start time and the average of the acquired use end time to be the use-time setting data for each combination of the user and the image forming apparatus 100. In addition, the schedule management unit 352 may set the use-time from the time before or after the average of use start time by a predetermined time to the time before or after the average of the use end time by a predetermined time, to a use-time setting data. In addition, instead of the average, the schedule management unit 352 may use a time of a predetermined rate such as 80%.

The log data used for calculating the statistics may be daily log data in a predetermined period in the past, log data excluding holidays, or log data of the same day of the week may be used.

In addition, the schedule management unit 352 may set the schedule information on the image forming apparatus 100 based on the log data of the image forming apparatus 100. The schedule management unit 352 calculates the statistics of the time period during which each image forming apparatus 100 was used in a predetermined period in the past from log data. The schedule management unit 352 sets the use-time period acquired from the calculated statistics to be the schedule information. The method of calculating the use-time period to be set to the schedule information is the same as the method of calculating the use-time period to be set to the use-time setting data described above.

In addition, the power-off checking unit 452 of the client terminal 400 may transmit the extension request for which the use end time is not set, to the management terminal 300. In this case, the power management unit 353 of the management terminal 300 updates the end time of the scheduled use set in the schedule information to an end time extended as much as a predetermined time. The predetermined period of time for the extension is, for example, a time equal to or longer than the checking interval of the sensor.

According to at least one embodiment described above, by providing the power management unit 353, it can be determined that the current time is within the use-time of the image forming apparatus 100 based on the schedule information, and if it is confirmed that a person is present by the sensor, the power supply of the image forming apparatus 100 is turned on. Therefore, the power management unit 353 can contribute to the energy saving, and additionally, can manage the power supplying state of the image forming apparatus 100 such that the waiting time at the starting of the image forming apparatus 100 can be shortened.

In addition, in the related art, the power of the image forming apparatus 100 was turned off based only on schedule information. Therefore, if it is determined that the current time is within the use-time by referring to the schedule information even though the illumination is turned off, the power of image forming apparatus 100 was not turned off even though there is actually no scheduled use. On the other hand, when the power control is performed only with the sensor, even if the current time is actually out of the scheduled use-time, when it is detected by the sensor that a person is present on the floor, the power supply of the image forming apparatus 100 was not turned off. Even if it is determined that the current time is within the use-time based on the schedule information, the management terminal 300 in the embodiment turns off the power of the image forming apparatus 100 at the time of further confirming that a person is not present. As a result, useless power usage can be reduced as much as possible. Accordingly, it is possible to greatly contribute to the energy saving.

In addition, the management terminal 300 notifies the client terminal 400 of the power-off before turning off the power of the image forming apparatus 100. The client terminal 400 received the notification requests for the extension of the use-time, and then, the management terminal 300 delays the power-off of the image forming apparatus 100. Accordingly, it is possible for the user to continuously use the image forming apparatus 100.

While certain embodiments have been described these embodiments have been presented by way of example only, and are not intended to limit the scope of the inventions. Indeed, the novel embodiment described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
an image processing device configured to form an image on a sheet;
a storage device configured to store schedule information indicating a schedule of use-time of the image processing device;
a power supply device configured to supply power to the image processing device; and
a control unit configured to control the power supply device so as to start supplying the power to the image processing device if the power supply device stops supplying the power to the image processing device at the use-time indicated by the schedule information and when a sensor provided at the installation site of the image forming apparatus determines that a detection result is a predetermined detection result,
the control unit is further configured to generate log data indicating identification information on the client terminal that uses the image forming apparatus, and to specify a transmission destination of an inquiry for the extension of the use-time based on the log data.

2. The apparatus according to claim 1,
wherein the control unit is configured to transmit the inquiry for the extension of the use-time to a client terminal before an end time of the use-time indicated by the schedule information, and if a request for the extension of the use-time is not received from the client terminal in response to the inquiry, to control the power supply device to stop supplying the power to the image processing device at the end time, and if the request for the extension of the use-time is received, to update the end time indicated by the schedule information to the use end time set in the extension request.

3. The apparatus according to claim 2,
wherein the control unit is configured to control the power supply device so as to stop supplying the power to the image processing device if the power supply device supplies the power to the image processing device at the use-time indicated by the schedule information and when the sensor determines that the detection result is not the predetermined detection result.

4. The apparatus according to claim 1,
wherein the control unit is configured to receive a scheduled use-time of the image forming apparatus from equal to or more than one client terminals, and to generate the schedule information of the image forming apparatus based on the received use-time.

5. The apparatus according to claim 1,
wherein the control unit is configured to generate log data indicating the time when the client terminal uses the image forming apparatus, and to generate the schedule information based on the log data.

6. The apparatus according to claim 1,
wherein the control unit is configured to set a type of the sensor that uses the result of detection among a plurality of types of the sensors.

7. A power control method comprising:
storing schedule information indicating a schedule of use-time of an image processing device that forms an image on a sheet in a storage device;
controlling the power supply device so as to start supplying the power to the image processing device if the power supply device stops supplying the power to the image processing device at the use-time indicated by the schedule information and when a sensor provided at an installation site of an image forming apparatus determines that a detection result is a predetermined detection result; and
generating log data indicating identification information on the client terminal that uses the image forming apparatus, and specifying a transmission destination of an inquiry for the extension of the use-time based on the log data.

8. The method according to claim 7, further comprising:
transmitting the inquiry for the extension of the use-time to a client terminal before an end time of the use-time indicated by the schedule information;
if a request for the extension of the use-time is not received from the client terminal in response to the inquiry, controlling the power supply device to stop supplying the power to the image processing device at the end time; and
if the request for the extension of the use-time is received, updating the end time indicated by the schedule information to the use end time set in the extension request.

9. The method according to claim 8, further comprising:
controlling the power supply device so as to stop supplying the power to the image processing device if the power supply device supplies the power to the image processing device at the use-time indicated by the schedule information and when the sensor determines that the detection result is not the predetermined detection result.

10. The method according to claim 7, further comprising:
receiving a scheduled use-time of the image forming apparatus from equal to or more than one client terminals, and generating the schedule information of the image forming apparatus based on the received use-time.

11. The method according to claim 7, further comprising:
generating log data indicating the time when the client terminal uses the image forming apparatus, and generating the schedule information based on the log data.

12. The method according to claim 7, further comprising:
setting a type of the sensor that uses the result of detection among a plurality of types of the sensors.

13. A non-transitory recording medium that stores a computer program for causing a computer to execute:
storing schedule information indicating a schedule of use-time of an image processing device that forms an image on a sheet in a storage device;
controlling the power supply device so as to start supplying the power to the image processing device if the power supply device stops supplying the power to the image processing device at the use-time indicated by the schedule information and when a sensor provided at an installation site of an image forming apparatus determines that a detection result is a predetermined detection result; and
generating log data indicating identification information on the client terminal that uses the image forming apparatus, and specifying a transmission destination of an inquiry for the extension of the use-time based on the log data.

14. The non-transitory recording medium according to claim 13, wherein the computer program further causes the computer to execute:
transmitting the inquiry for the extension of the use-time to a client terminal before an end time of the use-time indicated by the schedule information;

if a request for the extension of the use-time is not received from the client terminal in response to the inquiry, controlling the power supply device to stop supplying the power to the image processing device at the end time; and if the request for the extension of the use-time is received, updating the end time indicated by the schedule information to the use end time set in the extension request.

15. The non-transitory recording medium according to claim 14, wherein the computer program further causes the computer to execute:

controlling the power supply device so as to stop supplying the power to the image processing device if the power supply device supplies the power to the image processing device at the use-time indicated by the schedule information and when the sensor determines that the detection result is not the predetermined detection result.

16. The non-transitory recording medium according to claim 14, wherein the computer program further causes the computer to execute:

setting a type of the sensor that uses the result of detection among a plurality of types of the sensors.

17. The non-transitory recording medium according to claim 13, wherein the computer program further causes the computer to execute:

receiving a scheduled use-time of the image forming apparatus from equal to or more than one client terminals, and generating the schedule information of the image forming apparatus based on the received use-time.

18. The non-transitory recording medium according to claim 13, wherein the computer program further causes the computer to execute:

generating log data indicating the time when the client terminal uses the image forming apparatus, and generating the schedule information based on the log data.

* * * * *